(12) United States Patent
Cho et al.

(10) Patent No.: US 11,164,699 B2
(45) Date of Patent: Nov. 2, 2021

(54) ELECTRONIC COMPONENT

(71) Applicant: SAMSUNG ELECTRO-MECHANICS CO., LTD., Suwon-si (KR)

(72) Inventors: Beom Joon Cho, Suwon-si (KR); Ki Young Kim, Suwon-si (KR); Woo Chul Shin, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 40 days.

(21) Appl. No.: 16/401,583

(22) Filed: May 2, 2019

(65) Prior Publication Data

US 2020/0194175 A1 Jun. 18, 2020

(30) Foreign Application Priority Data

Dec. 17, 2018 (KR) ........................ 10-2018-0163289

(51) Int. Cl.
*H01G 4/232* (2006.01)
*H01G 2/06* (2006.01)
*H01G 4/30* (2006.01)
*H01G 4/12* (2006.01)

(52) U.S. Cl.
CPC ............. *H01G 4/232* (2013.01); *H01G 2/065* (2013.01); *H01G 4/30* (2013.01); *H01G 4/1227* (2013.01)

(58) Field of Classification Search
CPC ....... H01G 4/228; H01G 4/232; H01G 4/2325
See application file for complete search history.

(56) References Cited

U.S. PATENT DOCUMENTS

| 2001/0035563 | A1* | 11/2001 | Masumiya | ........... H01G 4/1227 257/532 |
| 2010/0085681 | A1* | 4/2010 | Takeda | ..................... H01B 3/12 361/301.4 |
| 2012/0236462 | A1* | 9/2012 | Haruki | ................... H01G 4/005 361/306.1 |
| 2016/0203913 | A1* | 7/2016 | Sun | ......................... H01G 4/12 361/306.3 |
| 2018/0294100 | A1* | 10/2018 | Ando | ..................... H01G 4/232 |

FOREIGN PATENT DOCUMENTS

| JP | 2000223355 A | * | 8/2000 | |
| JP | 2002-057063 A | | 2/2002 | |
| JP | 2004047671 A | * | 2/2004 | ............. H01G 2/065 |
| JP | 2009026906 A | * | 2/2009 | ............. H01G 2/065 |
| JP | 2012-033660 A | | 2/2012 | |
| JP | 2018-041904 A | | 3/2018 | |

* cited by examiner

*Primary Examiner* — Eric W Thomas
(74) *Attorney, Agent, or Firm* — Morgan, Lewis & Bockius LLP

(57) ABSTRACT

An electronic component includes a body, a pair of external electrodes, disposed on both ends of the body in a first direction, respectively, containing at least one of copper and nickel, while not containing a noble metal, a pair of metal frames connected to the pair of external electrodes, respectively, and a pair of conductive bonding layers, disposed between the external electrode and the metal frame, respectively, containing the same metal component as the external electrode.

18 Claims, 5 Drawing Sheets

ELECTRONIC COMPONENT

CROSS-REFERENCE TO RELATED APPLICATION(S)

This application claims benefit of priority to Korean Patent Application No. 10-2018-0163289 filed on Dec. 17, 2018 in the Korean Intellectual Property Office, the disclosure of which is incorporated herein by reference in its entirety.

BACKGROUND

The present disclosure relates to an electronic component.

Multilayer capacitors have been used in various electronic devices due to advantages thereof such as compactness and high capacitance.

Recently, due to the rapid rise in popularity of eco-friendly vehicles and electric vehicles, power driving systems in vehicles have increased, so that demand for multilayer capacitors required in such vehicles has increased.

In order to be used as a component for a vehicle, a multilayer capacitor should have a high level of thermal resistance or electrical reliability, and a required level of performance of the multilayer capacitor has gradually been increased.

Therefore, a structure of a multilayer capacitor having improved durability against vibrations or deformation has been required.

To improve such durability against vibrations or deformation, an electronic component having a structure, in which a multilayer capacitor is mounted at a predetermined distance from a board using a metal frame, has been proposed.

In the electronic component, an external electrode and a metal frame of the multilayer capacitor are bonded by a solder or the like. However, since the solder may be melted during a reflow process for board mounting, the multilayer capacitor may be separated from the metal frame or may be tilted.

SUMMARY

An aspect of the present disclosure is to provide an electronic component having improved bonding strength between a multilayer capacitor and a metal frame while improving durability of the multilayer capacitor.

According to an aspect of the present disclosure, an electronic component includes a body, a pair of external electrodes, disposed on external surfaces of the body in a first direction, respectively, containing at least one of copper or nickel, while not containing a noble metal, a pair of metal frames connected to the pair of external electrodes, respectively, and a pair of conductive bonding layers, disposed between the external electrode and the metal frame, respectively, containing the same metal component as the external electrode.

According to another aspect of the present disclosure, an electronic component includes a body, a pair of external electrodes, disposed on external surfaces of the body in a first direction, respectively, containing a noble metal, a pair of metal frames connected to the pair of external electrodes, respectively, and a pair of conductive bonding layers disposed between the pair of external electrodes and the pair of metal frames, respectively. Each of the pair of external electrodes has a thickness greater than or equal to a thickness of each of the pair of conductive bonding layers.

The body may include a plurality of dielectric layers and first and second internal electrodes, alternately disposed with respective dielectric layers interposed therebetween, having one ends exposed through both surfaces of the body in the first direction and connected to the first and second external electrodes, respectively.

The external electrode may include head portions disposed on both surfaces of the body in the first direction, respectively, and band portions extending from the head portions onto portions of top and bottom surfaces and portions of both side surfaces of the body, respectively.

The metal frame may include support portions bonded to the head portions of the external electrode, respectively, and mounting portions, extending from lower ends of the supporting portions in the first direction, respectively, spaced apart from the body and the external electrode.

The conductive bonding layers may be disposed between the head portions of the external electrodes and the support portions of the metal frames, respectively.

The external electrode may be a sintered electrode containing at least one of copper or nickel, and may further include a plating layer disposed on a surface of the external electrode. The plating layer may include a nickel plating layer covering the sintered electrode and a tin plating layer covering the nickel plating layer.

The conductive bonding layers may be in direct contact with outermost portions of the external electrodes, respectively, and each of the outermost portions of the external electrodes may contain at least one of copper or nickel, while not containing a noble metal.

Each of the outermost portions of the external electrodes may contain copper, while not containing a noble metal, and the conductive bonding layers may be made of copper-epoxy.

Each of the outermost portions of the external electrodes may contain nickel, while not containing a noble metal, and the conductive bonding layers may be made of nickel-epoxy.

The conductive bonding layers may contain no solder.

The conductive bonding layers may be in direct contact with outermost portions of the external electrodes, respectively, and each of the outermost portions of the external electrodes may contain the noble metal.

Each of the outermost portions of the external electrodes may include a sintered layer containing copper and the noble metal, and the conductive bonding layers may be made of the noble metal based epoxy.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
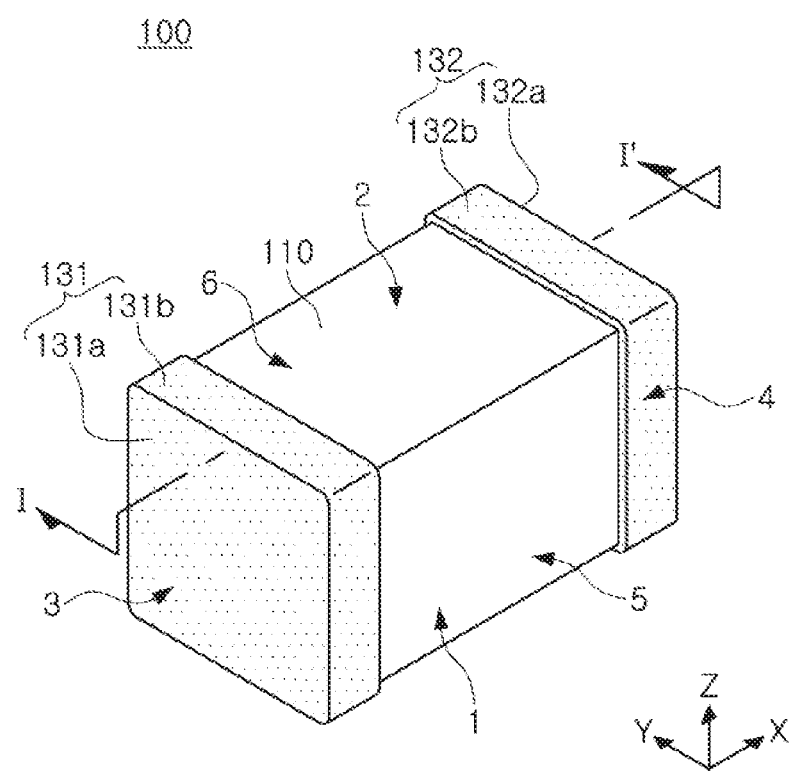
FIG. 1 is a perspective view of a multilayer capacitor according to an example embodiment in the present disclosure.

Hereinafter, embodiments of the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Through the specification, in addition, unless explicitly described to the contrary, the word "comprise" and variations such as "comprises" or "comprising," will be understood to imply the inclusion of stated elements but not the exclusion of any other elements.

For clarity of description of the example embodiment in the present disclosure, X, Y, and Z are defined as a length direction, a width direction, and a thickness direction of a multilayer capacitor and an electronic component, respectively.

The Z direction may be the same as a direction in which dielectric layers are laminated.

Figure 2A:
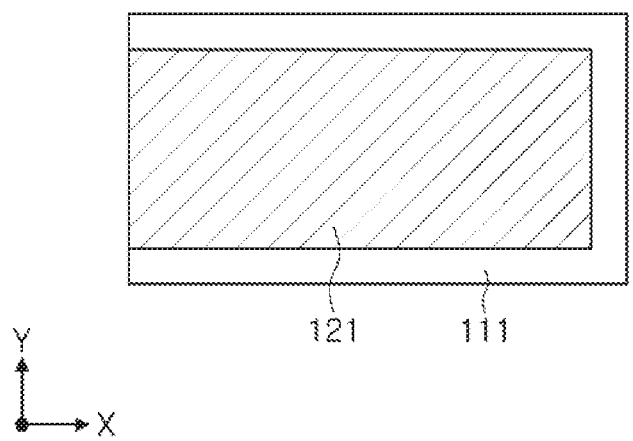
FIGS. 2A and 2B are plan views of a first internal electrode and a second internal electrode applied to the multilayer capacitor in FIG. 1.
Figure 2B:
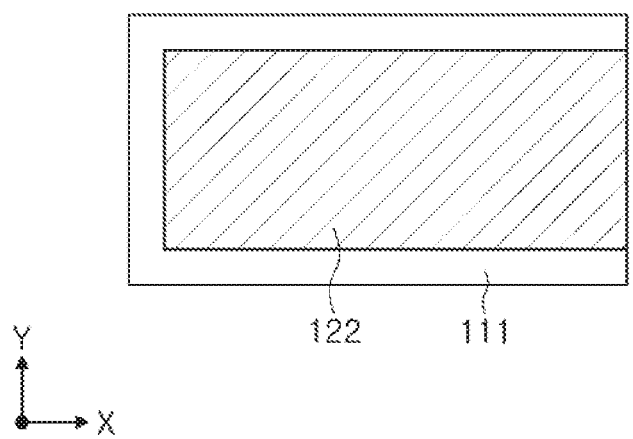

FIG. 1 is a perspective view of a multilayer capacitor according to an example embodiment in the present disclosure. FIGS. 2A and 2B are plan views of a first internal electrode and a second internal electrode applied to the multilayer capacitor in FIG. 1, and FIG. 3 is a cross-sectional view taken along line I-I' in FIG. 1.

Hereinafter, a structure of a multilayer capacitor applied to an electronic component according to the present example will be described with reference to FIGS. 1 to 3.

Figure 3:
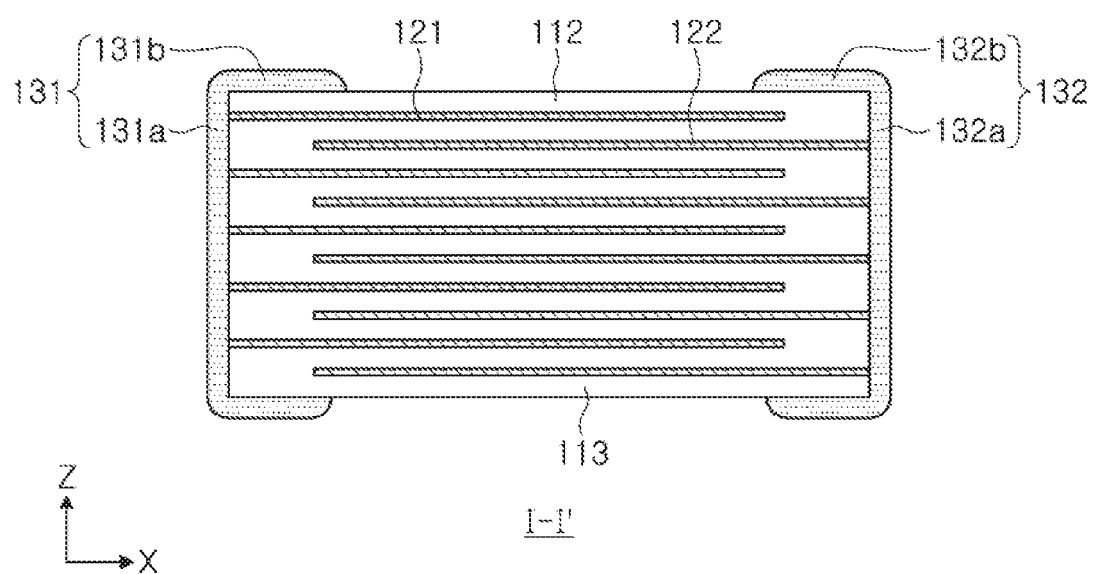
FIG. 3 is a cross-sectional view taken along line I-I' in FIG. 1.

Referring to FIGS. 1 to 3, a multilayer capacitor 100 according to the present embodiment includes a body 110 and first and second external electrodes 131 and 132 disposed on external surfaces of the body 110 in an X direction defined as a first direction, respectively.

The body 110 is formed by laminating a plurality of dielectric layers 111 in a Z direction and sintering the laminated dielectric layers 111. Adjacent dielectric layers 111 of the body 110 may be integrated with each other so that boundaries therebetween may not be readily apparent without using a scanning electron microscope (SEM).

The body 110 includes a plurality of dielectric layers 111 and first and second internal electrodes 121 and 122, having opposite polarities to each other, alternately disposed in the Z direction with respective dielectric layers 111 interposed therebetween.

The body 110 may include an active region as a portion, contributing to formation of capacitance of a capacitor, and cover regions 112 and 113 as margin portions in upper and lower portions of the body 110 in the Z direction.

The body 110 is not limited in shape, but may have a hexahedral shape. The body 110 may have first and second surfaces 1 and 2, disposed to oppose each other in the Z direction, third and fourth surfaces 3 and 4, connected to the first and second surfaces 1 and 2 and disposed to oppose each other in the X direction, and fifth and sixth surfaces 5 and 6 connected to the first and second surfaces 1 and 2 as well as to the third and fourth surfaces 3 and 4 and disposed to oppose each other in the Y direction.

The dielectric layer 111 may include ceramic powder particles, for example, a barium titanate ($BaTiO_3$)-based ceramic powder particles or the like.

The $BaTiO_3$-based ceramic powder particles may be $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which calcium (Ca) or zirconium (Zr) is partially employed in $BaTiO_3$, but a material of the ceramic powder particles is not limited thereto.

In addition to the ceramic powder particles, a ceramic additive, an organic solvent, a plasticizer, a binder, a dispersant, and the like may be further added to the dielectric layer 111.

The ceramic additive may include, for example, a transition metal oxide or a transition metal carbide, a rare earth element, magnesium (Mg), aluminum (Al), or the like.

The first and second internal electrodes 121 and 122, as electrodes applied with opposite polarities to each other, may be disposed on the dielectric layer 111 to be laminated in the Z direction. The first and second internal electrodes 121 and 122 may be alternately disposed to oppose each other with a single dielectric layer 111 interposed therebetween inside the body 110 in the Z direction.

In this case, the first and second internal electrodes 121 and 122 may be electrically insulated from each other by the dielectric layer 111 disposed in the middle thereof.

While a structure, in which internal electrodes are laminated in the Z direction, has been described in the present disclosure, the present disclosure is not limited to the structure. As needed, the present disclosure may be applied to a structure in which internal electrodes are laminated in the Y direction.

One ends of the first and second electrodes 121 and 122 may be exposed through the third and fourth surfaces 3 and 4 of the body 110, respectively.

End portions of the first and second internal electrodes 121 and 122, alternately exposed through the third and fourth surfaces 3 and 4 of the capacitor body 110, may be connected to the first and second external electrodes 131 and 132 disposed on the external surfaces of the body 110, to be described later, in the X direction to be electrically connected thereto, respectively.

According to the above-described configuration, charges are accumulated between the first and second internal electrodes 121 and 122 when a predetermined voltage is applied to the first and second external electrodes 131 and 132.

In this case, capacitance of the multilayer capacitor 100 may be proportional to an overlapping area between the first and second internal electrodes 121 and 122 overlapping each other in the active region in the z direction.

A material of the first and second internal electrodes 121 and 122 is not limited, and the first and second internal electrodes 121 and 122 may be formed using a conductive paste formed of at least one of a noble metal material, nickel (Ni), and copper (Cu).

The conductive paste may be printed by means of a screen printing method, a gravure printing method, or the like, but the printing method is not limited thereto.

The first and second external electrodes 131 and 132 may be provided with voltages having opposite polarities to each other and may be disposed on the external surfaces of the body 110 in the X direction. The first and second external electrodes 131 and 132 may be connected to the exposed end portions of the first and second internal electrodes 121 and 122, respectively, to be electrically connected to each other.

The first external electrode 131 may include a first head portion 131a and a first band portion 131b.

The first head portion 131a is disposed on the third surface 3 of the body 110 and is brought into contact with an end portion exposed outwardly from the first internal electrode 121 through the third surface 3 of the body 110 to physically and electrically connect the first internal electrode 121 and the first external electrode 131 to each other.

The first band portion 131b is a portion extending from the first head portion 131a to portions of the first, second, fifth, and sixth surfaces 1, 2, 5, and 6 of the body 110 to improve fixing strength or the like.

The second external electrode 132 may include a second head portion 132a and a second band portion 132b.

The second head portion 132a is disposed on the fourth surface 4 of the body 110 and is brought into contact with an end portion exposed outwardly from the second internal electrode 122 through the fourth surface 4 of the body 110 to physically and electrically connect the second internal electrode 122 and the second external electrode 132 to each other.

The second band portion 132b is a portion extending from the second head portion 132a to portions of the first, second, fifth, and sixth surfaces 1, 2, 5, and 6 of the body 110 to improve fixing strength or the like.

In the present embodiment, the first and second external electrodes 131 and 132 includes a sintered electrode including one or more types of a metal component selected from the group consisting of copper (Cu), nickel (Ni), and the like, but does not include a noble metal.

The first and second external electrodes 131 and 132 may be formed of a copper-containing sintered metal, and may have a surface on which a plating layer is additionally disposed.

The plating layer may include a nickel (Ni) plating layer, covering surfaces of the first and second external electrodes 131 and 132, and a tin (Sn) plating layer covering the nickel plating layer.

In this case, the nickel plating layer and the tin plating layer do not include a noble metal.

Figure 4:
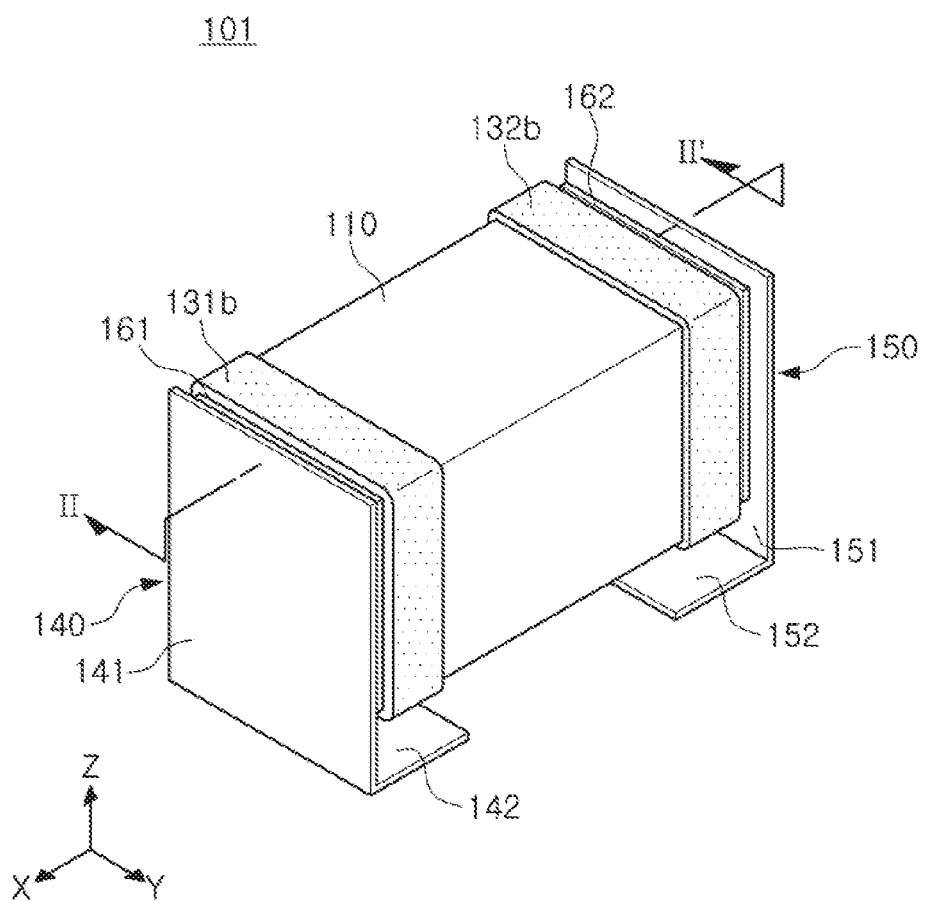
FIG. 4 is a perspective view illustrating that a metal frame is bonded to the multilayer capacitor in FIG. 1.
Figure 5:
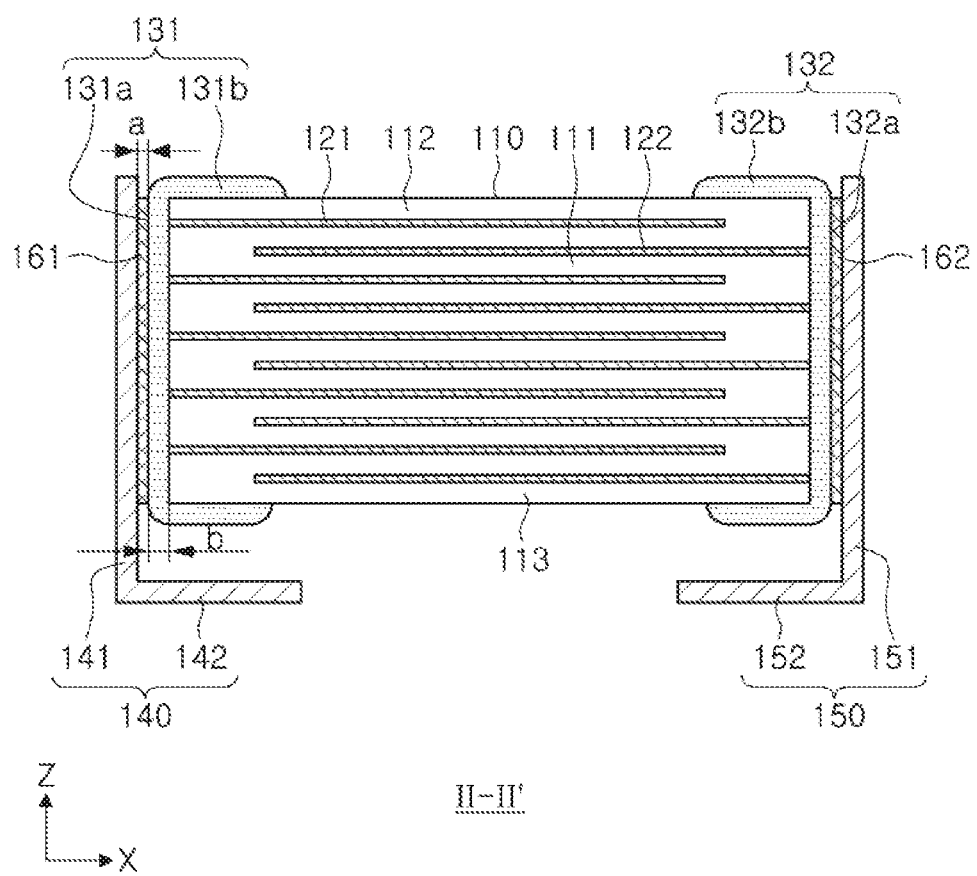
FIG. 5 is a cross-sectional view taken along line II-II' in FIG. 4.

FIG. 4 is a perspective view illustrating that a metal frame is bonded to the multilayer capacitor in FIG. 1, and FIG. 5 is a cross-sectional view taken along line II-II' in FIG. 4.

Referring to FIGS. 4 and 5, an electronic component 101 according to the present embodiment includes a multilayer capacitor 100, first and second metal frames 140 and 150 respectively connected to first and second external electrodes 131 and 132 of the multilayer capacitor 100, and first and second conductive boding layers 161 and 162.

The first metal frame 140 includes a first support portion 141 and a first mounting portion 142.

The first support portion 141 is disposed to be perpendicular to amounting surface, and is in contact with the first head portion 131a of the first external electrode 131. The first support portion 141 is electrically connected to the first head portion 131a of the first external electrode 131.

The first mounting portion 142 extends from a lower end of the first support portion 141 in the X direction, the first direction, to be parallel to the mounting surface, and serves as a connection terminal during board mounting.

The first mounting portion 142 is spaced apart from a bottom surface of the multilayer capacitor 100 by a predetermined distance in the Z direction, and is electrically connected to the first head portion 131a of the first external electrode 131 through the first support portion 141.

The second metal frame 150 includes a second support portion 151 and a second mounting portion 152.

The second support portion 151 is disposed to be perpendicular to the mounting surface, and is in contact with the second head portion 132a of the second external electrode 132. The second support portion 151 is electrically connected to the second head portion 132a of the second external electrode 132.

The second mounting portion 152 extends from a lower end of the second support portion 151 in the X direction, the first direction, to be parallel to the mounting surface while opposing the first mounting portion 151 in the X direction. The second mounting portion 152 serves as a connection electrode during board mounting.

The second mounting portion 152 is spaced apart from the bottom surface of the multilayer capacitor 100 by a predetermined distance in the Z direction, and is electrically connected to the second head portion 132a of the second external electrode 132 through the second support portion 151.

The first conductive bonding layer 161 is disposed between the first head portion 131a of the first external electrode 131 and the first support portion 141 of the first metal frame 140.

The first conductive bonding layer 161 is formed to contain the same metal component as the first head portion 131a of the first external electrode 131, as a main component.

For example, in the case in which the first external electrode 131 contains copper (Cu), a main component of the first conductive bonding layer 161 may be copper-epoxy. In the case in which the first external electrode 131 contains nickel (Ni), a main component of the first conductive bonding layer 161 may be nickel-epoxy.

In the case in which the first external electrode 131 includes a plating layer disposed on a surface of the first external electrode 131, a main component of the first conductive bonding layer 161 may be formed to contain the same component as a plating layer, disposed on an outermost portion, as a main component.

For example, in the present embodiment, in the case in which the plating layer includes a nickel plating layer and a tin plating layer covering the nickel plating layer, a main component of the first conductive bonding layer 161 may be a Sn—Cu-based solder containing tin as a main component.

The second conductive bonding layer 162 is disposed between the second head portion 132a of the second external electrode 132 and the second support portion 151 of the second metal frame 150.

The second conductive bonding layer 162 is formed to contain the same metal component as the second head portion 132a of the second external electrode 132, as a main component.

For example, in the case in which the second external electrode 132 contains copper (Cu), a main component of the second conductive bonding layer 162 may be copper-epoxy. In the case in which the second external electrode 132 contains nickel (Ni), a main component of the second conductive bonding layer 162 may be nickel-epoxy.

In the case in which the second external electrode 132 includes a plating layer disposed on a surface of the second external electrode 132, a main component of the second conductive bonding layer 162 may be formed to contain the same component as a plating layer, disposed on an outermost portion, as a main component.

For example, in the present embodiment, in the case in which the plating layer includes a nickel plating layer and a tin plating layer covering the nickel plating layer, a main component of the second conductive bonding layer 162 may be a Sn—Cu-based solder containing tin as a main component.

In a multilayer capacitor according to a related art, a capacitor body and a substrate are brought into contact with each other by a solder during board mounting. Therefore, heat, generated by a board, or mechanical deformation, occurring on the board, is directly transferred to the multilayer capacitor to make it difficult to secure high-level reliability.

However, in the present embodiment, first and second metal frames are bonded to both surfaces of a multilayer capacitor in the X direction to secure a gap between the multilayer capacitor and a mounting board. Thus, stress from the board may be prevented from being directly applied to the multilayer capacitor to improve reliability.

In a multilayer capacitor including a metal frame according to a related art, a capacitor and the metal frame are bonded by a solder. Since the solder is melted during a reflow process for board mounting, the multilayer capacitor is separated from the metal frame or may be tilted.

In addition, boundaries between the metal frame and the solder and between an external electrode and the solder are bonded by dissimilar materials. Therefore, when the boundaries are exposed to a thermal impact environment such as a temperature cycle or the like for a long period of time, a stress, caused by a difference between coefficients of thermal expansion of respective materials, may be accumulated to result in deterioration and separation of the boundaries.

Moreover, galvanic corrosion may occur. The galvanic corrosion refers to a phenomenon in which corrosion of a metal having lower corrosion resistance is accelerated due to a potential difference under a corrosive environment during bonding of dissimilar metals.

The galvanic corrosion is promoted by the difference in corrosion resistance or activity between two metals brought into contact with each other. When a noble metal and a common metal are brought into contact with each other, corrosion of the common metal is promoted.

In order to address the deterioration of a bonded boundary, a noble metal is contained in both an external electrode and a conductive bonding layer to secure interfacial stability in a related art.

However, in a process, it is difficult to bond the entire boundary using bonding between noble metals. Additionally, use of the noble metals causes manufacturing cost to be increased.

In the present embodiment, both the external electrode and the conductive bonding layer do not use a noble metal. In a high-temperature and high-humidity environment, a boundary may include a single component, rather than multiple components in a related art, to prevent delamination and galvanic corrosion caused by a different in coefficient of thermal expansion (CTE).

As described above, the galvanic corrosion, occurring at the boundary between the external electrode and the conductive bonding layer, may be prevented to reduce deterioration at the boundary and separation of the external electrode which occur in a related art. Accordingly, it is expected that the external electrode will be thinned.

Further, since no noble metal is used, manufacturing cost of an electronic component according to a related art may be prevented from increasing.

An experiment was conducted to confirm that stability of a boundary between an external electrode and a conductive bonding layer is improved in an electronic component using a metal frame.

Table (1) lists bonding states depending on components of the external electrode and the conductive bonding layer. Samples 1 and 2 were external electrodes formed of copper. Samples 3 and 4 were obtained by additionally forming a nickel plating layer on a surface of an external electrode, formed of copper, and plating tin on the nickel plating layer.

One hundred electronic components were manufactured for each sample. After the electronic components were maintained at a temperature of 85 degrees Celsius and a humidity range of 95% RH for 1,000 hours, equivalent series resistance (ESR) was measured. After the experiment, in the case in which ESR was greater than 200 m$\Omega$, it was determined to be a failure. Such a failure means that the bonding state of the external electrode is poor.

TABLE 1

| | Outermost Component of External Electrode | | | |
|---|---|---|---|---|
| | Cu | | Sn | |
| # | 1 | 2 | 3 | 4 |
| Main component of Conductive Bonding Layer | Cu epoxy | Sn—Ag—Cu Solder | Ag epoxy | Sn—Ag—Cu Solder |
| ESR Failure Rate | 0% | 5% | 12% | 0% |

Table (1) shows Sample 1 and Sample 2 in which an external electrode of a multilayer capacitor was formed as a copper-sintered electrode. In the case of Sample 1 in which an external electrode was bonded to a conductive bonding layer formed of copper epoxy containing the same copper component as the external electrode, no ESR failure occurred.

However, in the case of Sample 2 in which an external electrode was bonded to a conductive bonding layer formed of a Sn—Ag—Cu solder containing tin (Sn) as a main component, 5% of ESR failure occurred.

Table (1) also shows Sample 3 and Sample 4 in which an external electrode of a multilayer capacitor included a tin plating layer on a surface of the external electrode. In the case of Sample 4 in which an external electrode is bonded to a conductive bonding layer formed of a Sn—Ag—Cu solder containing the same tin as the external electrode as a main component, no failure occurred at ESR although the conductive bonding layer contained noble metal.

However, in the case of Sample 3 in which an external electrode was bonded to a conductive bonding layer, formed of silver-epoxy, containing silver, a noble metal, as a main component and not containing tin as a main component, 12% of ESR failure occurred.

Accordingly, it can be understood that, in order to secure reliability, matching of main metal components, contained in an external electrode and a conductive bonding layer, is effective while preventing the external electrodes of a multilayer capacitor from containing a noble metal.

According to another example embodiment, the first and second external electrodes 131 and 132 may partially contain a noble metal such as silver (Ag) or palladium (Pd).

In the present embodiment, the first and second conductive bonding layers 161 and 162 are formed using the same metal component as the first and second external electrodes 131 and 132 to be bonded, as a main component. For example, when the first and second external electrodes 131 and 132 contain silver, a main component of the first and second conductive bonding layers 161 and 162 may be silver-epoxy or palladium-epoxy.

When the first and second external electrodes 131 and 132 include a plating layer, the first and second conductive bonding layers 161 and 162 may be formed using the same metal component as outermost plating layer, as a main component.

For example, when the plating layer includes a nickel plating layer and a tin plating layer covering the nickel plating layer, the first and second conductive bonding layers 161 and 162 may be formed of a tin-silver (Sn—Ag) based solder or a tin-silver-copper (Sn—Ag—Cu) based solder containing tin as a main component.

In this case, each of the first and second external electrodes 131 and 132 may have a thickness "b" equal to or greater than a thickness "a" of each of the first and second conductive bonding layers 161 and 162.

Accordingly, even when corrosion occurs on a boundary of a conductive bonding layer in contact with an external electrode, a thickness of a side of the external electrode, serving as an anode, is further increased to prevent charge deficiency at a side of the anode. As a result, a degradation in electrical characteristics of a multilayer capacitor and an electronic component may be prevented.

Table (2) lists bonding states depending on thicknesses of an external electrode and a conductive bonding layer according to another example embodiment. The external electrode is formed as a copper-containing sintered electrode, and the conductive bonding layer is formed of silver-epoxy.

One hundred electronic components were manufactured by varying the thickness of the external electrode and the thickness of the conductive bonding layer for each sample. After the electronic components were maintained a temperature of 85 degrees Celsius and a humidity range of 95% RH for 1,000 hours, equivalent series resistance (ESR) was measured. After the experiment, in the case in which ESR was greater than 200 m$\Omega$, it was determined to be defective. Such a failure means that the bonding state of the external electrode is poor.

TABLE 2

| # | 1 | 2 | 3 | 4 | 5 |
|---|---|---|---|---|---|
| Thickness of External Electrode (μm) | 20 | 20 | 20 | 20 | 30 |
| Thickness of Conductive Bonding Layer (μm) | 5 | 10 | 20 | 30 | 30 |
| ESR Failure Rate | 0% | 0% | 0% | 3% | 0% |

In general, when a noble metal is not contained in an external electrode and is contained in a conductive bonding layer, the external electrode may be corroded by galvanic corrosion when the external electrode is brought into contact with the noble metal of the conductive bonding layer.

Referring to Table (2), when an external electrode had a thickness of 20 μm, no ESR failure occurred in the case of Samples 1 to 3 in which a conductive layer had a thickness less than or equal to the thickness of the external electrode.

However, in the case of Sample 4 in which the conductive bonding layer had a thickness greater than the thickness of the external electrode, 3% of ESR failure occurred.

In the case of Sample 5 in which the thickness of the conductive bonding layer was increased to 30 μm, when the thickness of the external electrode was also increased to 30 μm, no ESR failure occurred.

Accordingly, when a noble metal is contained in the conductive bonding layer, in detail, b≥a in which "a" denotes a thickness of the conductive bonding layer and "b" denotes a thickness of the external electrode.

As described above, durability of a multilayer capacitor may be improved and bonding strength between an external electrode and a metal frame may be improved.

While example embodiments have been shown and described above, it will be apparent to those skilled in the art that modifications and variations could be made without departing from the scope of the present disclosure as defined by the appended claims.

What is claimed is:

1. An electronic component comprising:
    a body;
    a pair of external electrodes, disposed on both ends of the body in a first direction, respectively, containing at least one of copper or nickel, while not containing a noble metal;
    a pair of metal frames connected to the pair of external electrodes, respectively; and
    a pair of conductive bonding layers, disposed between the external electrodes and the pair of metal frames, respectively, containing a noble metal,
    wherein each of the pair of external electrodes has a thickness, along an entire boundary with each of the pair of conductive bonding layers, greater than or equal to a thickness of each of the pair of conductive bonding layers.

2. The electronic component of claim 1, wherein the body comprises:
    a plurality of dielectric layers; and
    first and second internal electrodes, alternately disposed with respective dielectric layers interposed therebetween, having one ends exposed through both surfaces of the body in the first direction and connected to the pair of external electrodes, respectively.

3. The electronic component of claim 1, wherein the external electrodes comprise:
    head portions disposed on both surfaces of the body in the first direction, respectively; and
    band portions extending from the head portions onto portions of top and bottom surfaces and portions of both side surfaces of the body, respectively.

4. The electronic component of claim 3, wherein the metal frames comprise:
    support portions bonded to the head portions of the external electrodes, respectively; and
    mounting portions, extending from lower ends of the support portions in the first direction, respectively, spaced apart from the body and the external electrodes.

5. The electronic component of claim 4, wherein the conductive bonding layers are disposed between the head portions of the external electrodes and the support portions of the metal frames, respectively.

6. The electronic component of claim 1, wherein at least one of the external electrodes includes a sintered electrode containing at least one of copper or nickel, and further includes a plating layer disposed on a surface of the sintered electrode, and
    the plating layer includes a nickel plating layer covering the at least one of the external electrodes and a tin plating layer covering the nickel plating layer.

7. The electronic component of claim 1, wherein the conductive bonding layers are in direct contact with outermost portions of the external electrodes, respectively, and
    each of the outermost portions of the external electrodes contains at least one of copper or nickel, while not containing a noble metal.

8. The electronic component of claim 7, wherein each of the outermost portions of the external electrodes contains copper, while not containing a noble metal, and
    the conductive bonding layers are made of silver-epoxy.

9. The electronic component of claim 7, wherein each of the outermost portions of the external electrodes contains nickel, while not containing a noble metal, and
    the conductive bonding layers are made of silver-epoxy.

10. The electronic component of claim 1, wherein the conductive bonding layers contain no solder.

11. An electronic component comprising:
a body;
a pair of external electrodes, disposed on both ends of the body in a first direction, respectively, containing a first noble metal from the body in the first direction;
a pair of metal frames connected to the pair of external electrodes, respectively; and
a pair of conductive bonding layers, each containing a second noble metal, disposed between the pair of external electrodes and the pair of metal frames, respectively,
wherein each of the pair of external electrodes has a thickness, along an entire boundary with each of the pair of conductive bonding layers, greater than or equal to a thickness of each of the pair of conductive bonding layers.

12. The electronic component of claim 11, wherein the body comprises:
a plurality of dielectric layers; and
first and second internal electrodes, alternately disposed with respective dielectric layers interposed therebetween, having one ends exposed through both surfaces of the body in the first direction and connected to the pair of external electrodes, respectively.

13. The electronic component of claim 11, wherein the external electrodes comprise:
head portions disposed on both surfaces of the body in the first direction, respectively; and
band portions extending from the head portions onto portions of top and bottom surfaces and portions of both side surfaces of the body, respectively.

14. The electronic component of claim 13, wherein the metal frames comprise:
support portions bonded to the head portions of the external electrodes, respectively; and
mounting portions, extending from lower ends of the support portions in the first direction, respectively, spaced apart from the body and the external electrodes.

15. The electronic component of claim 14, wherein the conductive bonding layers are disposed between the head portions of the external electrodes and the support portions of the metal frames, respectively.

16. The electronic component of claim 11, wherein the conductive bonding layers are in direct contact with outermost portions of the external electrodes, respectively, and
each of the outermost portions of the external electrodes contains the first noble metal.

17. The electronic component of claim 16, wherein each of the outermost portions of the external electrodes includes a sintered layer containing the first noble metal, and
the conductive bonding layers include an epoxy containing the second noble metal.

18. The electronic component of claim 11, wherein the conductive bonding layers contain no solder.

* * * * *